(12) United States Patent
Mao et al.

(10) Patent No.: US 10,912,414 B2
(45) Date of Patent: Feb. 9, 2021

(54) INFRARED TEMPERATURE EQUALIZING DEVICE AND GRILL THEREOF

(71) Applicant: Ningbo Agsun Products,Inc., Zhejiang (CN)

(72) Inventors: Xuefei Mao, Zhejiang (CN); Xianghua Liu, Zhejiang (CN); Luoda Ying, Zhejiang (CN)

(73) Assignee: Ningbo Agsun Products, Inc., Zhejiang (CN)

( * ) Notice: Subject to any disclaimer, the term of this patent is extended or adjusted under 35 U.S.C. 154(b) by 59 days.

(21) Appl. No.: 16/397,908

(22) Filed: Apr. 29, 2019

(65) Prior Publication Data

US 2020/0229644 A1 Jul. 23, 2020

(30) Foreign Application Priority Data

Jan. 17, 2019 (CN) .......................... 2019 1 0045106

(51) Int. Cl.
*A47J 37/07* (2006.01)
*F23D 14/12* (2006.01)
*F23D 14/14* (2006.01)

(52) U.S. Cl.
CPC ....... *A47J 37/0786* (2013.01); *A47J 37/0713* (2013.01); *F23D 14/125* (2013.01); *F23D 14/14* (2013.01)

(58) Field of Classification Search
CPC . A47J 37/0786; A47J 37/0713; F23D 14/125; F23D 14/14
USPC ................. 126/25 R, 41 R, 39 E, 332, 152 B
See application file for complete search history.

(56) References Cited

U.S. PATENT DOCUMENTS

2012/0222665 A1\* 9/2012 Ahmed ............... A47J 37/0682
126/25 R

\* cited by examiner

*Primary Examiner* — Vivek K Shirsat
(74) *Attorney, Agent, or Firm* — Muncy, Geissler, Olds and Lowe, P.C.

(57) ABSTRACT

An infrared temperature equalizing device and a grill thereof having a first vertical plate, a first folded plate, a second vertical plate, and a second folded plate. The first folded plate is connected with the second folded plate to form a cover. The first vertical plate and the second vertical plate form a wall. The wall and the cover form a heat aggregation chamber for hot air aggregation and circulation, which has a closed top and a bottom opening with a longitudinal depth. The temperature equalizing device achieves heat aggregation, temperature rising, and temperature equalizing. Through infrared and convection heating, the grill can heat food evenly and roast the food quickly.

8 Claims, 5 Drawing Sheets

INFRARED TEMPERATURE EQUALIZING DEVICE AND GRILL THEREOF

TECHNICAL FIELD

The present invention relates to the field of roasting, and in particular, to a temperature equalizing device and a grill thereof.

BACKGROUND

At present, a fire guiding plate of a gas grill on the market is simple in structure and functions, and only has functions of blocking grease and guiding heat. Moreover, due to the limitation of the structure, grease dripped on the fire guiding plate in the process of roasting likely causes deflagration and sets food on fire, affecting customer experience and causing potential safety hazards. A conventional gas grill is generally equipped with an atmospheric burner, and is heated by convection heating. Influenced by the heat flow guide, temperature distribution on the grill net is often uneven. A high-end grill is equipped with a ceramic plate infrared burner, and the infrared heating achieves rapid temperature rising and even temperature, but the price is high.

SUMMARY OF THE INVENTION

An objective of the present invention is to provide a temperature equalizing device, which can well concentrate heat and preserve heat to make the temperature uniform. Another objective of the invention is to provide a grill applying the temperature equalizing device, which can achieve easy cleaning of the grill and a dual effect of infrared and thermal convection.

To achieve the foregoing objectives, the technical solutions proposed in the present invention are as follows.

An infrared temperature equalizing device comprises a first plate and a second plate that are bilaterally symmetric. The first plate includes a first vertical plate and a first folded plate above the first vertical plate. The second plate includes a second vertical plate and a second folded plate above the second vertical plate. The first folded plate is connected with the second folded plate to form a cover. The diameter of the cover is gradually reduced upward from the bottom of the cover. The first vertical plate and the second vertical plate form a wall. The wall and the cover form a heat aggregation chamber for hot air aggregation and circulation, which has a closed top and a bottom opening with a longitudinal depth.

Preferably, the infrared temperature equalizing device further comprises a first guide plate and a second guide plate, wherein the first guide plate is connected below the first vertical plate, the second guide plate is connected below the second vertical plate, and the first guide plate and the second guide plate form a splayed hot air guide portion at the opening.

Preferably, the wall is provided with heat dissipation holes.

Preferably, the heat dissipation holes are vertical S-shaped and are classified into two groups, the first group is disposed at one end of the heat aggregation chamber and close to the wall of the cover, and the second group is disposed below the first group and evenly spaced along the wall.

Preferably, the maximum width of the heat aggregation chamber does not exceed 20 mm, and the depth of the heat aggregation chamber is at least 4 times of its width.

Preferably, the first plate and the second plate are integrally formed.

Preferably, the first guide plate and the first plate are integrally formed, and the second guide plate and the second plate are integrally formed.

A grill comprises a grill body, a burner, a temperature equalizing device, and a gridiron. The burner is mounted inside the grill body, the gridiron is mounted above the burner, the temperature equalizing device is mounted between the burner and the gridiron, an opening of the temperature equalizing device directly faces a fire outlet of the burner, the projection of the temperature equalizing device on a fire hole of the burner is greater than or equal to the size of the flame, and the temperature equalizing device includes the temperature equalizing device of any of the foregoing.

Preferably, the burner is a single-hole burner.

Preferably, the bottom of the grill body is funnel shaped, and an oil receiving box is disposed at the bottom of the funnel.

The present invention has the following technical effects.

The temperature equalizing device of the present invention has a small width and a longitudinal depth, can well achieve a heat aggregation chamber. The heat aggregation chamber achieves rapid temperature rise and desirable insulation effect. In addition, when the heat aggregation chamber is made of stainless steel plates, the high temperature inside the heat aggregation chamber heat the iron plate to red, forming an infrared heating effect. Through the dual heating of infrared and convection, the temperature around the heat aggregation chamber will be more even.

The temperature equalizing device of the present invention is especially suitable for the field of barbecue grills and other warming or heating fields.

When the grill of the temperature equalizing device is used, because of a small projection area of the temperature equalizing device on the grill net or gridiron, grease does not easily reach a temperature equalizing plate if the grease drips in the process of roasting, which can effectively reduce the probability of deflagration and improve customer experience and safety. Grease and food residue will not be left on the temperature equalizing plate, so the temperature equalizing plate is easy to clean.

In addition, the grill adopts a single-hole atmospheric burner, and the infrared temperature equalizing device having a cavity whose longitudinal depth is greater than the transverse width can form an infrared heating effect, food can be roasted more quickly through the dual heating of infrared and convection, and the food is heated evenly during roasting.

BRIEF DESCRIPTION OF THE DRAWINGS

The accompanying drawings of the specification constituting a part of this application are used to provide further understanding of the present invention. Schematic embodiments of the present invention and the descriptions thereof are used to interpret the present invention, and do not constitute improper limitations to the present invention.

In the drawings.

DETAILED DESCRIPTION

The present invention is described in detail in the following with reference to the accompanying drawings and specific embodiments. Schematic embodiments and illustrations are only used to explain the present invention but do not improperly limit the present invention.

It should be noted that embodiments in this application and features in the embodiments can be combined with each other without a conflict. The present invention is described in detail in the following with reference to the accompanying drawings and the embodiments.

Figure 1:
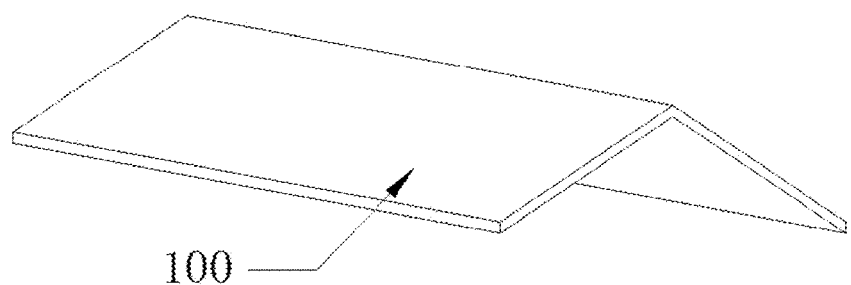
FIG. 1 is a schematic structural diagram of a common temperature equalizing plate in the prior art.
Figure 2:
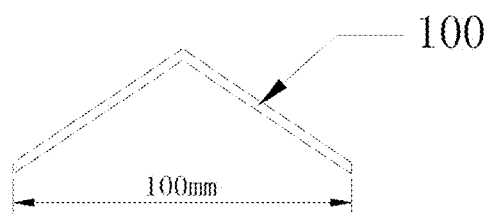
FIG. 2 is a schematic front structural diagram of FIG. 1.
Figure 3:
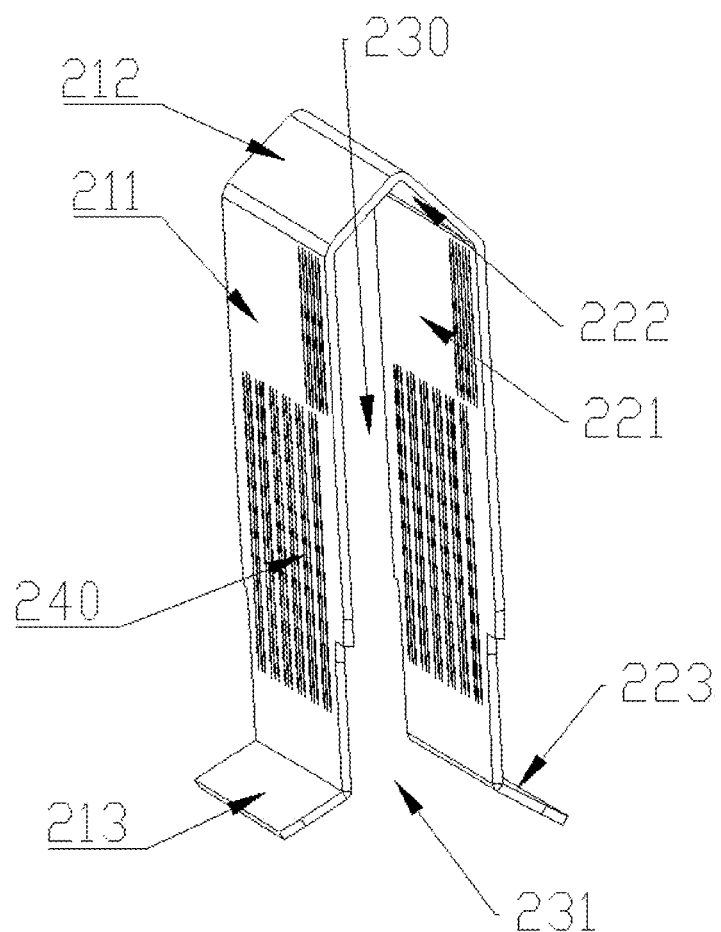
FIG. 3 is a schematic overall structural diagram of the present invention.
Figure 4:
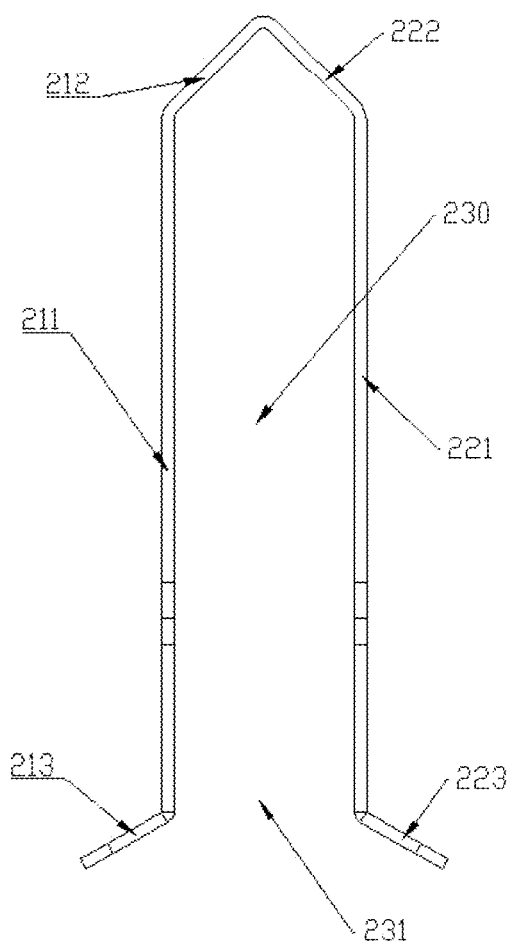
FIG. 4 is a schematic front structural diagram of FIG. 3.
Figure 5:
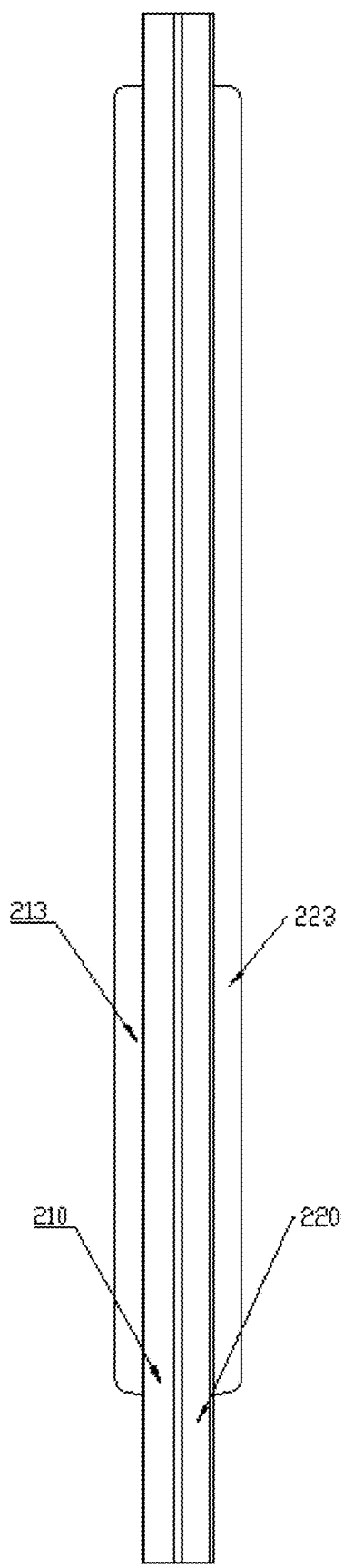
FIG. 5 is a schematic top structure diagram of FIG. 3.
Figure 6:
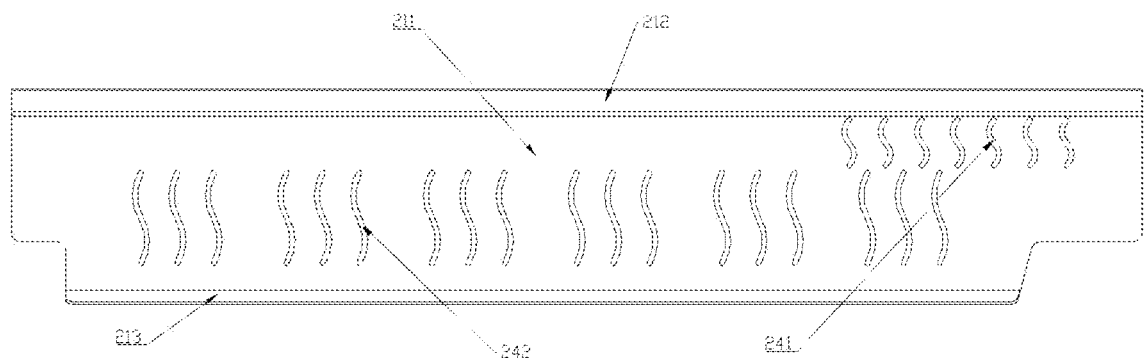
FIG. 6 is a schematic left structural diagram of FIG. 3.

FIG. 1 and FIG. 2 show a common temperature equalizing plate in prior art, which has a triangular cross section and a width greater than or equal to 100 mm. The temperature equalizing plate covers over the burner, and is heated to achieve a more balanced heating temperature of the burner.

FIG. 3 to FIG. 6 show an infrared temperature equalizing device in the present invention. An infrared temperature equalizing device includes a first plate and a second plate that are bilaterally symmetric. The first plate 210 includes a first vertical plate 211 and a first folded plate 212 above the first vertical plate 211. The second plate 220 includes a second vertical plate 221 and a second folded plate 222 above the second vertical plate 221. The first folded plate is connected with the second folded plate to form a cover. The diameter of the cover is gradually reduced upward from the bottom of the cover. The first vertical plate and the second vertical plate form a wall. The wall and the cover form a heat aggregation chamber 230 for hot air aggregation and circulation, which has a closed top and a bottom opening with a longitudinal depth.

In the present invention, the cover may be triangular, parabolic with a downward opening, or in another structure with a large bottom and a small top, which is not limited here.

The first plate and the second plate are integrally formed or separated. For example, the first vertical plate and the first folded plate that make up the first plate can be formed by integrally bending one plate or by welding or bolting two plates together, which is not limited here. Similarly, the second plate is also not limited.

Likewise, the first plate and the second plate are integrally formed or separated, which is not limited here.

The first vertical plate and the second vertical plate are parallel to each other, which are preferably straight plates. They can be set to corrugated plates or plates in other shapes for aesthetic or other requirements, which is not limited here.

The plates that form the heat aggregation chamber can be stainless steel plates, iron plates, flange plates, or the like. As such, when the temperature rises to some extent, the plates can go red and produce a better infrared effect.

Definitely, other plates such as ceramic or copper plates are also available, which is not limited here.

Here, the bottom opening 231 and the heat aggregation chamber 230 with the longitudinal depth achieve a quick temperature rising effect and a desirable heat aggregation effect, so that the temperature equalizing device can be quickly heated to a certain temperature within a short period and kept at the high temperature stably.

Table 1 shows temperature values (° C.) of the surface of the heat aggregation chamber in the present invention recorded every 1 min at a first temperature measuring point 250 within 15 min.

| 23.6 | 408.2 | 576.6 | 621.4 | 689.5 | 741.9 | 740.9 | 756.0 | 757.9 | 764.0 | 749.0 | 757.9 | 759.2 | 758.3 | 760.1 |

Table 2 shows temperature values (° C.) of the surface of the heat equalizing plate in the prior art (FIG. 1) recorded every 1 min at a second temperature measuring point 260 within 15 min.

| 20.6 | 181.1 | 303.9 | 347.6 | 358.2 | 369.8 | 374.8 | 379.1 | 381.4 | 390.5 | 393.9 | 397.0 | 395.2 | 398.1 | 397.5 |

It can be seen from Table 1 and Table 2 that in the same period of time, the speed of temperature rise of the temperature equalizing device of the present invention is twice that of the ordinary temperature equalizing plate. The temperature equalizing device achieves quick temperature rise and then keeps at a stable temperature.

In order to improve the hot air flow, a guide portion is disposed at the opening, including a first guide plate 213 and a second guide plate 223. The first guide plate is connected below the first vertical plate, the second guide plate is connected below the second vertical plate, and the first guide plate and the second guide plate form a splayed hot air guide portion at the opening.

The opening has a certain guiding effect on the rising hot air flow, and it can prevent the air flow of this part from diffusing so as to ensure that the air flow can enter into the heat aggregation chamber well.

Inner surfaces of the first guide plate and the second guide plate can be provided with some guide channels to increase the flow of air. The specific shape of the guide channel is not limited here.

In addition, the wall (the first vertical plate and the second vertical plate) is provided with heat dissipation holes. The shape of the heat dissipation holes 240 can be horizontally oblong, vertically oblong, circular, S-shaped, H-shaped, or the like, and can be selected or combined according to the requirements of the heat dissipation area, which is not limited here.

A preferred structure of heat dissipation holes is provided here. The heat dissipation holes are vertical S-shaped and classified into two groups. The first group 241 is disposed at one end of the heat aggregation chamber and close to the wall of the cover. The second group 242 is disposed below the first group and evenly spaced along the wall.

Compared with other forms, the heat dissipation holes disposed in this manner achieves higher temperature equalizing effect than that of ordinary oblong holes.

Preferably, the maximum width of the heat aggregation chamber does not exceed 20 mm, and the depth of the heat aggregation chamber is at least 4 times of its width.

The heat aggregation chamber is required to have a certain depth to achieve aggregation and retention of hot air, where the depth of the heat aggregation chamber is 5 times the width, or more.

A grill includes an grill body 300, a burner 310, a temperature equalizing device 200, and a grill net 320 (gridiron). The burner is mounted inside the grill body, the gridiron is mounted above the burner, the temperature equalizing device is mounted between the burner and the gridiron, an opening of the temperature equalizing device directly faces a fire outlet of the burner, the projection of the temperature equalizing temperature device on a fire hole of the burner is greater than or equal to the size of the flame, and the temperature equalizing device includes the temperature equalizing device of any of the foregoing.

Contrast data under the same conditions is shown in the following Table 3 and Table 4.

Figure 7:
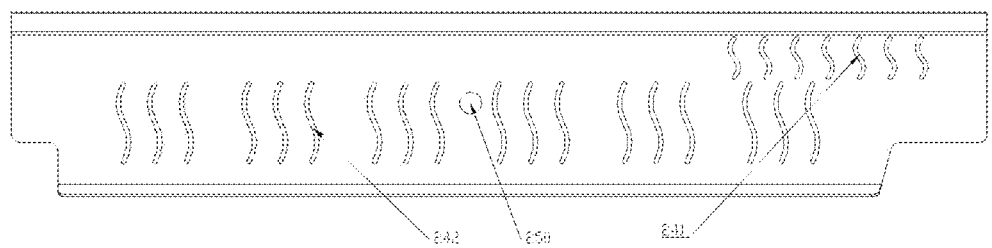
FIG. 7 is a schematic diagram of a heat collection point (at a central position of a first vertical plate or a second vertical plate) of a temperature equalizing plate according to the present invention.
Figure 8:
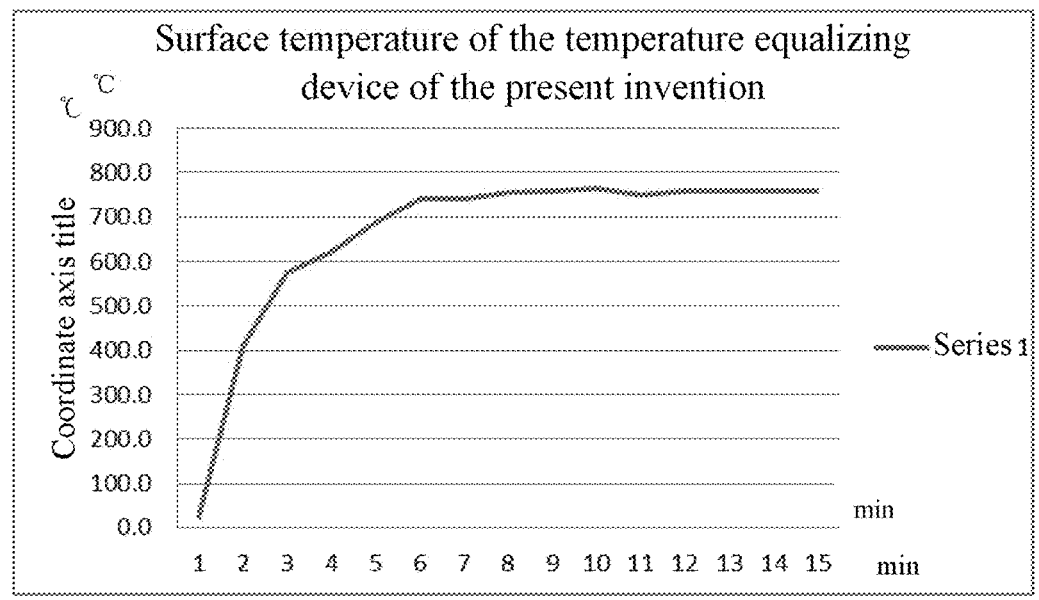
FIG. 8 is a schematic curve chart of Table 1.

Table 3 below is a schematic diagram of heat collection points on a surface of a grill net on a grill using the heat aggregation device according to the present invention (FIG. 7), in which a temperature value (° C.) is recorded for each collection point every 1 min by 15 times in total (including the initial temperature).

| Temperature of the grill net (infrared temperature equalizing plate of the cavity) 12 points are evenly distributed on the surface of the grill net | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 29.6 | 36.0 | 44.3 | 28.3 | 42.2 | 37.0 | 29.3 | 28.3 | 30.9 | 29.2 | 28.1 | 25.6 |
| 64.7 | 85.4 | 91.6 | 57.7 | 93.8 | 95.3 | 65.7 | 57.7 | 78.9 | 58.1 | 70.5 | 72.5 |
| 96.8 | 128.5 | 125.2 | 107.2 | 146.3 | 147.6 | 107.6 | 106.2 | 131.2 | 101.5 | 126.1 | 118.5 |
| 128.9 | 168.1 | 156.3 | 157.4 | 189.7 | 194.0 | 144.0 | 155.3 | 183.2 | 147.1 | 190.9 | 168.6 |
| 163.7 | 205.4 | 192.3 | 201.6 | 223.6 | 232.8 | 182.1 | 206.0 | 226.8 | 188.3 | 236.4 | 210.8 |
| 196.2 | 237.1 | 224.6 | 235.9 | 258.2 | 261.5 | 210.7 | 236.1 | 261.4 | 221.5 | 263.3 | 243.3 |
| 222.5 | 264.7 | 252.8 | 263.5 | 282.5 | 286.0 | 237.3 | 267.3 | 289.9 | 248.6 | 291.5 | 268.9 |
| 246.6 | 286.5 | 277.2 | 286.0 | 301.6 | 304.9 | 261.2 | 285.9 | 313.3 | 270.7 | 312.4 | 289.8 |
| 264.4 | 303.8 | 293.9 | 302.1 | 313.2 | 316.6 | 277.1 | 301.4 | 327.8 | 287.1 | 329.8 | 305.3 |
| 284.6 | 317.3 | 307.8 | 314.2 | 329.2 | 327.8 | 294.1 | 316.3 | 341.2 | 300.3 | 342.5 | 320.1 |
| 299.6 | 327.7 | 317.2 | 326.4 | 336.1 | 336.1 | 306.9 | 325.5 | 351.9 | 310.9 | 351.9 | 331.1 |
| 310.4 | 337.1 | 325.8 | 334.2 | 342.4 | 344.4 | 315.8 | 334.8 | 357.7 | 319.1 | 358.1 | 337.8 |
| 319.3 | 342.7 | 333.4 | 340.3 | 346.0 | 350.4 | 321.3 | 341.3 | 363.6 | 325.2 | 364.7 | 344.4 |
| 326.1 | 348.7 | 337.4 | 344.8 | 352.4 | 353.6 | 328.7 | 345.6 | 367.9 | 331.3 | 369.1 | 349.7 |
| 331.4 | 352.4 | 345.6 | 347.4 | 350.9 | 356.1 | 331.6 | 346.4 | 370.4 | 335.5 | 372.7 | 353.2 |
| 336.7 | 355.9 | 349.5 | 350.3 | 353.8 | 359.7 | 337.1 | 350.9 | 374.0 | 338.9 | 373.8 | 357.5 |

It can be seen from Table 3 that the temperature of the surface of the grill net is rises quickly, and in the process of temperature rising, the temperature difference between two adjacent points is small. After the temperature rises to a certain degree, the temperatures of various points are relatively even and stable.

For an infrared temperature equalizing device having a longitudinal cavity, as heat is aggregated in the cavity to heat the temperature equalizing plate, the temperature of the temperature equalizing plate is increased quickly, and the temperature equalizing plate goes red and produces infrared waves which radiates the heat evenly to the grill net. The speed of temperature rise is fast, the temperature equalizing performance is good (the 12-point range is 37.3° C.), the average temperature is high (353.2° C.) in the same power, and the infrared wave effect is evident.

Figure 9:
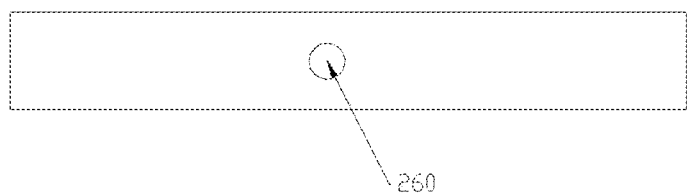
FIG. 9 is a schematic diagram of a heat collection point (at a central position of one side) of the common temperature equalizing plate in the prior art.
Figure 10:
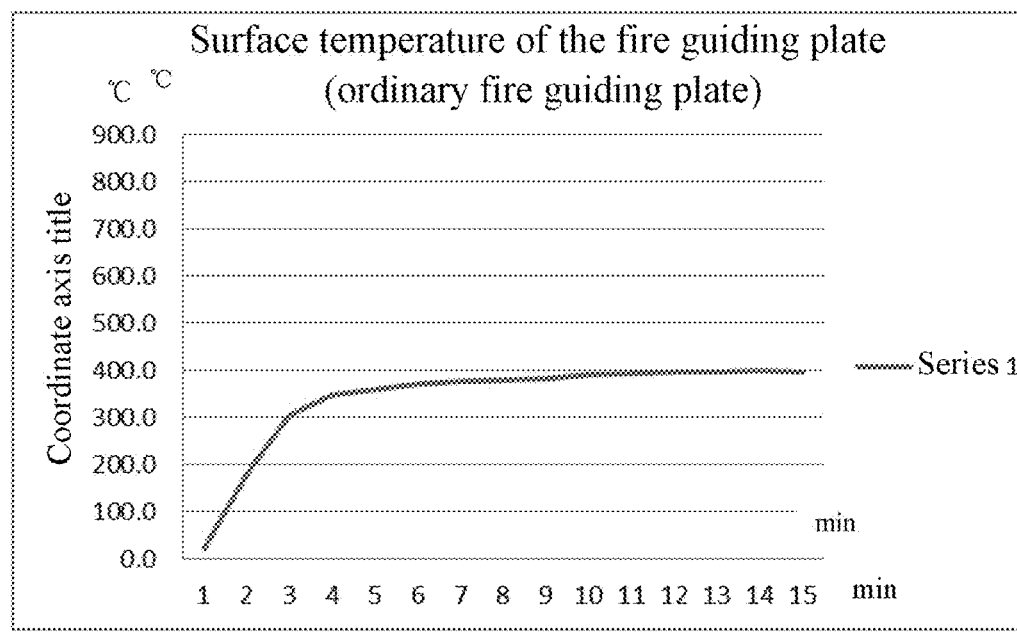
FIG. 10 is a schematic curve chart of Table 2.
Figure 11:
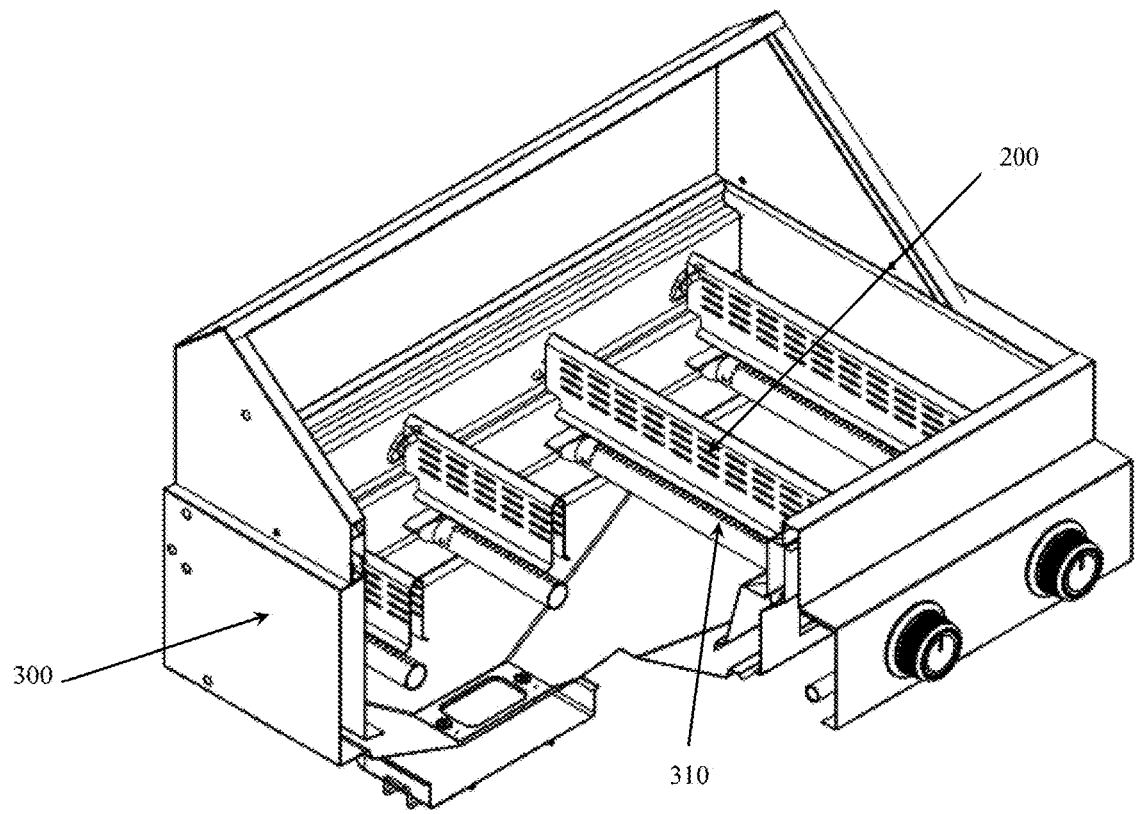
FIG. 11 is a schematic diagram of a grill according to the present invention (heat dissipation holes of a temperature equalizing device in the figure are horizontally oblong and evenly distributed, but the grill net is not drawn).

Table 4 below is a schematic diagram of heat collection points on a surface of a grill net on a grill of a temperature equalizing plate (FIG. 1) in the prior art (FIG. 9), in which a temperature value (° C.) is recorded for a collection point every 1 min by 15 times in total (including the initial temperature).

| Temperature of the grill net (common fire guiding plate) 12 points are evenly distributed on the surface of the grill net | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 31.0 | 31.1 | 31.9 | 28.8 | 28.5 | 28.2 | 28.6 | 28.3 | 25.0 | 30.7 | 29.2 | 27.0 |
| 63.8 | 50.4 | 62.4 | 48.0 | 70.1 | 64.3 | 54.7 | 53.3 | 59.6 | 47.1 | 43.5 | 51.4 |
| 85.9 | 85.2 | 103.9 | 77.7 | 101.4 | 111.6 | 83.5 | 84.4 | 118.2 | 73.2 | 82.3 | 107.8 |

-continued

Temperature of the grill net (common fire guiding plate) 12
points are evenly distributed on the surface of the grill net

| 1 | 2 | 3 | 4 | 5 | 6 | 7 | 8 | 9 | 10 | 11 | 12 |
|---|---|---|---|---|---|---|---|---|----|----|----|
| 107.9 | 122.4 | 148.7 | 110.9 | 132.8 | 157.9 | 113.4 | 123.0 | 165.3 | 103.3 | 127.0 | 157.7 |
| 131.3 | 159.0 | 186.4 | 140.8 | 163.3 | 197.8 | 141.2 | 160.0 | 206.3 | 133.3 | 167.8 | 197.6 |
| 150.3 | 189.9 | 216.0 | 166.5 | 190.8 | 227.1 | 165.1 | 192.1 | 235.2 | 160.7 | 201.4 | 226.5 |
| 167.4 | 214.9 | 240.6 | 187.1 | 212.6 | 249.0 | 185.7 | 217.4 | 258.1 | 183.8 | 227.7 | 250.4 |
| 184.5 | 235.4 | 260.8 | 204.2 | 231.2 | 266.7 | 202.8 | 237.5 | 275.5 | 203.2 | 247.8 | 268.4 |
| 200.0 | 251.8 | 275.3 | 219.0 | 247.7 | 280.4 | 218.3 | 253.7 | 287.7 | 219.8 | 263.7 | 282.9 |
| 214.5 | 265.7 | 288.3 | 231.8 | 261.6 | 291.6 | 231.3 | 267.0 | 298.6 | 233.9 | 276.9 | 295.4 |
| 226.8 | 277.1 | 298.5 | 243.2 | 271.5 | 301.7 | 242.6 | 278.2 | 307.3 | 245.9 | 287.8 | 305.4 |
| 238.0 | 287.1 | 307.3 | 251.7 | 281.0 | 309.0 | 251.5 | 287.5 | 315.4 | 254.8 | 296.3 | 313.9 |
| 249.7 | 294.4 | 315.1 | 259.0 | 287.9 | 315.1 | 259.2 | 294.8 | 321.1 | 262.8 | 303.3 | 320.6 |
| 257.9 | 299.9 | 318.5 | 265.0 | 294.4 | 319.9 | 265.6 | 299.8 | 326.0 | 269.3 | 308.7 | 326.2 |
| 264.0 | 304.2 | 323.7 | 270.9 | 298.3 | 322.5 | 270.8 | 304.5 | 328.8 | 274.6 | 313.0 | 330.4 |
| 267.9 | 308.0 | 325.5 | 274.5 | 302.5 | 326.8 | 275.5 | 307.0 | 333.8 | 278.0 | 316.0 | 335.4 |

It can be seen from Table 4 that the speed of temperature rise of the ordinary temperature equalizing plate is low, and the elevated temperature is limited. The temperature equalizing performance is poor (the 12-point range is 67.5° C.), and the average temperature is low (304.2° C.) in the same power.

In the same period of time, the highest temperature of the temperature equalizing device according to the present invention is about 70° C. higher than that of the temperature equalizing plate in the prior art. Moreover, the time used by the heat aggregation device of the present invention is half of that used by the existing temperature equalizing plate when heated to the same temperature, and thus the heat aggregation device is more energy-saving and environment friendly.

Preferably, the burner is a single-hole burner. The combustion point of the single-hole burner is vertically upward, which makes it easier to gather the temperature. If it is a double-hole burner, the guide portion can be added to achieve aggregation and retention of the temperature.

Preferably, the bottom of the grill body is funnel shaped, and an oil receiving box is disposed at the bottom of the funnel.

The above descriptions are merely preferred embodiments of the present invention, which are not used to limit the present invention. For those skilled in the art, the present invention can have various alterations and changes. Any modification, equivalent replacement, improvement and the like made within the spirit and principle of the present invention should all be encompassed in the protection scope of the present invention.

The invention claimed is:

1. An infrared temperature equalizing device, comprising a first plate and a second plate that are bilaterally symmetric, wherein the first plate comprises a first vertical plate and a first folded plate above the first vertical plate; the second plate comprises a second vertical plate and a second folded plate above the second vertical plate;

the first folded plate is connected with the second folded plate to form a cover; the width of the cover is gradually reduced upward from the bottom of the cover; and the first vertical plate and the second vertical plate form a wall;

the wall and the cover form a heat aggregation chamber for hot air aggregation and circulation, which has a closed top and a bottom opening with a longitudinal depth; and the wall is provided with heat dissipation holes, which are vertical S-shaped and are classified into two groups, the first group is disposed at one end of the heat aggregation chamber and close to the wall of the cover, and the second group is disposed below the first group and evenly spaced along the wall.

2. The infrared temperature equalizing device of claim 1, further comprising a first guide plate and a second guide plate, wherein the first guide plate is connected below the first vertical plate, the second guide plate is connected below the second vertical plate, and the first guide plate and the second guide plate form a splayed hot air guide portion at the opening.

3. The infrared temperature equalizing device of claim 1, wherein the maximum width of the heat aggregation chamber does not exceed 20 mm, and the depth of the heat aggregation chamber is at least 4 times of its width.

4. The infrared temperature equalizing device of claim 1, wherein the first plate and the second plate are integrally formed.

5. The infrared temperature equalizing device of claim 4, wherein the first guide plate and the first plate are integrally formed, and the second guide plate and the second plate are integrally formed.

6. A grill comprising an grill body, a burner, a temperature equalizing device, and a gridiron, wherein the burner is mounted inside the grill body, the gridiron is mounted above the burner, the temperature equalizing device is mounted between the burner and the gridiron, an opening of the temperature equalizing device directly faces a fire outlet of the burner, the projection of the temperature equalizing temperature device on a fire hole of the burner is greater than or equal to the size of the flame, and the temperature equalizing device comprises the temperature equalizing device of claim 1.

7. The grill of claim 6, wherein the burner is a single-hole burner.

8. The grill of claim 6, wherein the bottom of the grill body is funnel shaped, and an oil receiving box is disposed at the bottom of the funnel.

* * * * *